United States Patent [19]
Alderson et al.

[11] 3,961,927
[45] June 8, 1976

[54] APPARATUS AND METHOD FOR MOULDING GLASS OBJECTS

[75] Inventors: John Victor Alderson, Southport; Donald Frederick Stanley, Wigan; John Duncan Rudd, Newburgh, near Wigan, all of England

[73] Assignee: Pilkington Brothers Limited, Liverpool, England

[22] Filed: July 2, 1975

[21] Appl. No.: 592,630

Related U.S. Application Data

[63] Continuation of Ser. No. 446,000, Feb. 26, 1974, abandoned.

[30] Foreign Application Priority Data

| Mar. 5, 1973 | United Kingdom | 10640/73 |
| Mar. 26, 1973 | United Kingdom | 14490/73 |
| Aug. 8, 1973 | United Kingdom | 37641/73 |

[52] U.S. Cl. ................................ 65/25 R; 65/76; 65/84; 65/182 A
[51] Int. Cl.² .......................................... C03B 11/00
[58] Field of Search ............ 65/25 R, 25 A, 70, 84, 65/75, 76, 182 A, 245, 254

[56] References Cited
UNITED STATES PATENTS

| 679,705 | 7/1901 | Sievert et al. | 65/256 |
| 1,739,519 | 12/1929 | Peiler | 65/25 R |
| 2,395,727 | 2/1946 | Devol | 65/182 A |
| 2,478,090 | 8/1949 | Devol | 65/182 A |
| 3,254,981 | 6/1966 | Havens | 65/359 |

FOREIGN PATENTS OR APPLICATIONS

| 231,759 | 11/1968 | U.S.S.R. | |

Primary Examiner—Arthur D. Kellogg
Attorney, Agent, or Firm—Burns, Doane, Swecker & Mathis

[57] ABSTRACT

A method of shaping glass to a desired form comprises delivering molten glass on to a porous support member while feeding a gas under pressure through the porous support member from the reverse side thereof, so as to support the molten glass out of contact with the support member on a cushion of gas, allowing the glass to assume a shape approximating to that of the support member under the forces of surface tension, gravity and gas cushion pressure, cooling the glass while thus supported on the gas cushion to a temperature at which it is so conditioned that it can be shaped by contact with a solid surface without any substantial surface damage, and shaping the conditioned glass by a shaping process which involves contact with a solid surface.

The shaping process may be a moulding process, which can be carried out either in the porous support member or in a separate mould to which the glass is transferred. The gas, e.g. nitrogen or nitrogen + 5% hydrogen, may be fed to the porous support member at ambient temperature. Alternatively, for controlling the rate of heat transfer from the supported glass, the temperature and/or flow rate of the gas may be controlled, or the temperature of the environment of the porous support member may be controlled, e.g. using a muffle. The shaping process may alternatively be a rolling process, the glass flowing from a channel-shaped porous support member to a pair of rollers.

50 Claims, 19 Drawing Figures

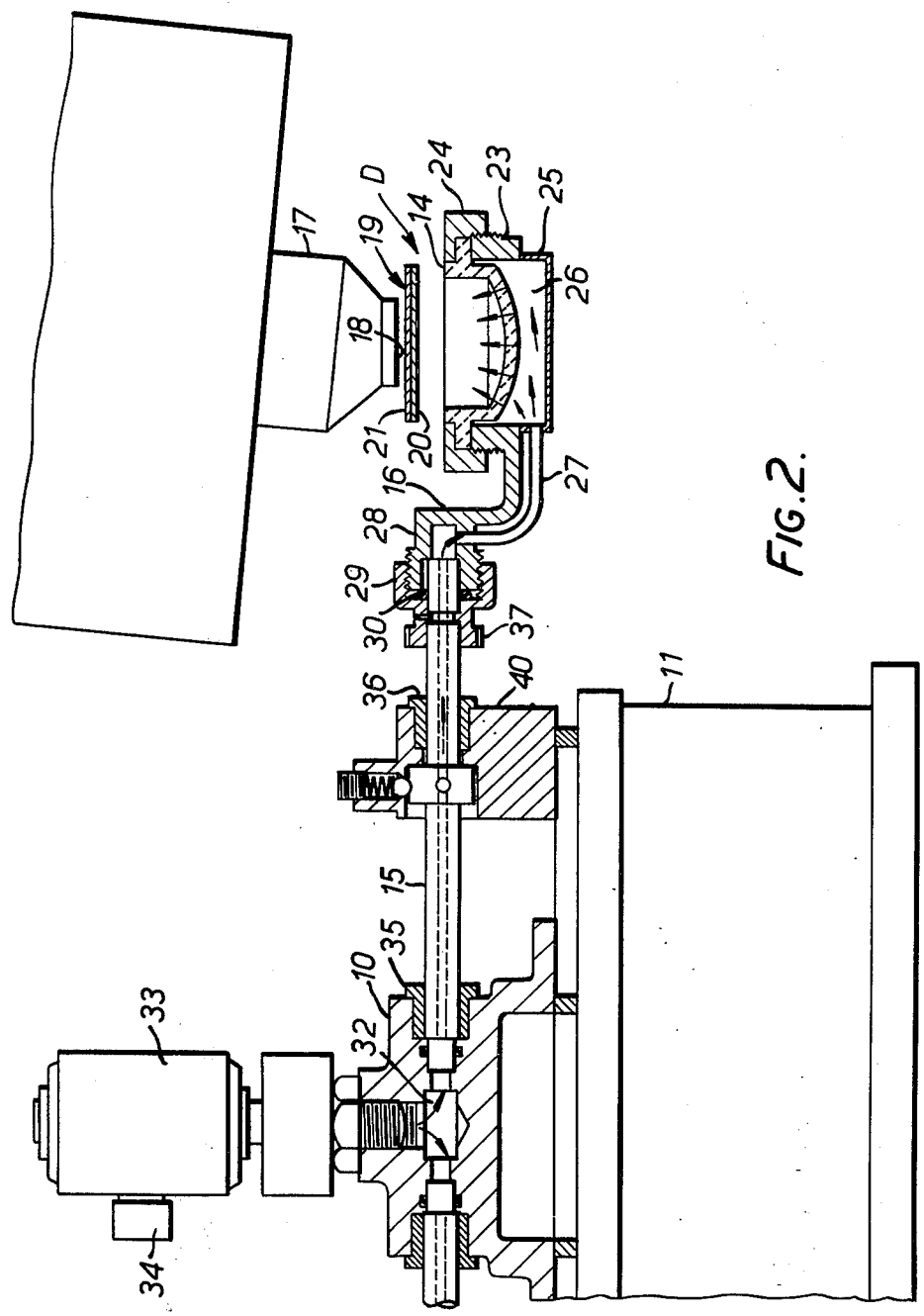

APPARATUS AND METHOD FOR MOULDING GLASS OBJECTS

This is a continuation of application Ser. No. 446,000, filed Feb. 26, 1974, now abandoned.

BACKGROUND OF THE INVENTION

1. Field of the Invention

This invention relates to the shaping of glass to a desired form. It has for object to make it possible to obtain a high and accurate surface finish in a relatively simple and economical manner.

One application of the invention is to the shaping of glass articles, such as lens blanks, by a moulding or pressing process, with the object of producing on the article at least one surface which, on completion of the glass shaping process, will need relatively little or no finishing treatment to be of substantially optical quality. Another application is to the shaping of flat or ribbon glass by means of rollers, with the object of producing a ribbon having at least one surface of high quality, requiring little or no finishing treatment.

2. Description of the Prior Art

Glass articles to be used in the formation of optical equipment such as lenses and prisms are at present formed by processes which involve the formation of a blank which is subsequently ground and polished, or re-pressed from fire finished glass rod in highly polished moulds to give the final accurate surface of optical quality. Grinding and polishing is an expensive and time-consuming process, and a reduction in the quantity of glass to be removed from the blank to form the final article can result in a substantial increase in throughput where large numbers of blanks are being processed. Re-pressing is virtually a one-off, hand-operated process, involving re-heating fire polished glass rod and pressing in highly polished moulds. Re-pressing is used where polishing and grinding are unusually difficult and expensive, e.g. in the formation of aspheric lenses of the "Bulls Eye" type. Another problem occurs with glasses which are very fluid at the liquidus temperature, since they pour too freely from the supply of molten glass, which must be held above the liquidus to avoid risk of devitrification. In the case of lens blanks, this problem has usually been dealt with by using a technique known as "puddle loading", in which the glass is allowed to pour directly into the mould, as it will not form a gob which can be cut off and allowed to drop into the mould as in conventional lens moulding processes. The blank produced by puddle loading requires considerable grinding and polishing to achieve a finished state. Optical glass is also continuously cast into blocks for sale. In this form the end user cuts the glass into convenient sections for re-pressing. It is not possible to cast optical glass in relatively thin sections, e.g. of the order of 4 mm thick and 60 mm wide, because contact with solid mould surfaces during casting causes surface damage and ripples which entail polishing and grinding the surface of the blocks, and this would not be economic for the smaller quantity of glass in thin sections.

In the moulding of, for example, lens blanks, the conventional process involves the use of a rotating table provided with a series of moulds which are indexed round, being fed with a glass gob or puddle-loaded at one station, the glass being pressed at another station, and taken out and transferred to a lehr at the last station. The sequence of operations can be carried out rapidly because no two operations are physically carried out at the same position on the table. Precise temperature control of the individual moulds is, however, difficult to achieve without measures which would be prohibitively expensive for a product such as lens blanks, though individual mould temperature control systems have been suggested for use in forming more expensive articles, such as face panels for television tubes.

It will be evident that the processing time from glass feed to finished shape would be reduced if the process of surface finishing could be eliminated or if such an improvement in the finish of the article or shape when it leaves the shaping process could be effected that the amount of finishing (e.g. grinding or polishing) required was considerably reduced.

It has long been known that hot glass which can distort or flow, e.g. which is in a softened or even liquid condition, can be supported on a film of air without contacting the supporting surface. Thus sticking or damage to the glass surface would, it was realised, be avoided by providing such a cushion support. The only really large scale application of this technique has been in the processes used for bending glass in sheet form without marring the surface, in which the hot, softened glass sheets are supported on and fed along a contoured bed through which air is blown through a large number of small apertures, while the sheets sag into the desired curved form. Suggestions have also been made for feeding molten glass between porous rollers and then supporting the glass sheet formed on a porous air bed. Contact of glass with the rollers, it was thought, would be prevented by a cushion of air or other gas being supplied through the pores in the rollers. Another technique involving the use of a gas cushion has been employed in the blow moulding of electric lamp glass envelopes in paste moulds, in which the paste is moistened before moulding so that a cushion of steam forms between the mould surface and the glass.

The previous proposals for the use of a gas cushion support were thus directed to reducing or preventing contact between the shaping surface or surfaces and the glass being shaped during shaping or subsequent processing.

SUMMARY OF THE INVENTION

We have developed the concept of using a gas cushion to provide a means of supporting the glass while it is conditioned to a state at which it can contact a solid surface without substantial surface damage, and we have found that this provides a novel and practical application of the basic principle that glass in a state where it can distort or flow can be supported out of contact with a surface.

According to the invention, a method of shaping glass to a desired form comprises delivering molten glass on to a porous support member while feeding a gas under pressure through the porous support member, from the reverse side thereof, so as to support the molten glass out of contact with the support member on a cushion of gas, allowing the glass to assume a shape approximating to that of the support member under the forces of surface tension, gravity and gas cushion pressure, cooling the glass while thus supported on the gas cushion to a temperature at which it is so conditioned that it can be shaped by contact with a solid surface without any substantial surface damage, and shaping the conditioned glass by a shaping process which involves contact with a solid surface.

By this method, surface damage to the glass during the shaping process is substantially eliminated, so that the requirement for subsequent surface finishing is much reduced or even avoided altogether, and process times can be correspondingly reduced. The method of the invention is applicable to processes wherein the conditioned glass is shaped by a moulding process, in which case the moulding process may be carried out by pressing the glass into contact with the porous support member, which constitutes a mould member, or the conditioned glass may be removed from the porous support member to a separate mould in which the moulding process is carried out.

The method of the invention is also applicable to processes wherein the conditioned glass is shaped by a rolling process, in which case the conditioned glass may be fed directly from the porous support member to at least one pair of temperature controlled, polished finishing rollers.

The condition of the glass surface in each of these cases will be determined primarily by the physical smoothness of the contacting surface, i.e. the surface of the mould or of the rollers, as the glass itself has a surface temperature which minimises surface damage.

In cases where the conditioned glass is shaped by a moulding process, it is preferred that a measured quantity of the molten glass is delivered into the porous support member. When using a glass which has a low viscosity at the liquidus temperature, the measured quantity of glass is preferably delivered through a gate adapted to be opened to allow the measured quantity to pass. With certain glass viscosities, it is also advantageous to arrange that the porous support member is raised up to a position immediately below the gate before the gate is opened, and is then slowly lowered as the glass is delivered through the gate. Alternatively, the porous support member may, in conventional manner, be charged with the molten glass in the form of a viscous gob which is severed from a mass of glass issuing from an outlet by normally open cut-off means.

The gas may be fed to the mould at ambient temperature. Where necessary, however, the rate of heat transfer from the glass, while supported on the gas cushion, is controlled by controlling the temperature of the gas and/or the flow rate of the gas, or by controlling the temperature of the environment of the porous support member, e.g. to ensure that the gob is not cooled too quickly while being brought into condition for moulding, or that the temperature gradient within the gob does not become too steep.

The gas may be fed to the mould at a pressure of the order of 1 to 30 pounds per square inch above atmospheric. The gas may be nitrogen, or preferably a mixture of nitrogen with substantially 5% by volume hydrogen.

As indicated above, in many cases it is preferred that the conditioned glass is removed from the porous support member to a separate mould in which the moulding process is carried out.

The advantages of this method are principally that the gob can be brought into a suitable condition for moulding independently of the viscosity of delivery, i.e. its temperature can be adjusted while it is supported in the receptacle to produce the desired viscosity and it can, if desired, be pre-formed into roughly the desired shape, before being delivered to the mould. Hence it is particularly useful with a glass of low viscosity at the liquidus temperature. The glass delivered into the porous support member can be kept substantially out of contact with the walls of the support member by the fluid pressure exerted on the gob by the supporting cushion of gas, so substantially reducing the incidence of chill marks and other imperfections.

Preferably a plurality of the receptacles are indexed around a closed path between a delivery station, at which the glass is delivered into each support member in turn, and a transfer station, at which the glass is removed from the support member for delivery to a moulding station.

In cases where the moulding process is carried out by pressing the glass into contact with the porous support member, which constitutes a mould member, it is preferred to use an open-topped support member with porous side and/or bottom walls of concave shape, a pressing tool being pressed down on to the glass from above to form the glass to the desired shape.

In cases where the conditioned glass is shaped by a rolling process to ribbon form, it is preferred to use a channel-shaped porous support member and the glass, while supported on the gas cushion, is allowed to flow along the channel-shaped support member while assuming a ribbon shape under the forces of surface tension, gravity and gas cushion pressure, and the conditioned glass is then passed between at least one pair of polished rollers to shape it to the desired final ribbon form.

The invention also resides in an apparatus for shaping glass to a desired form, comprising a porous support member, means for delivering molten glass on to the porous support member, means for feeding a gas under pressure through the porous support member from the reverse side thereof, so as to support the molten glass out of contact with the support member on a cushion of gas while the glass assumes a shape approximating to that of the support member, and means for subsequently shaping the glass by a shaping process which involves contact with a solid surface. Where the means for shaping the glass by a process which involves contact with a solid surface is a moulding device, it is in many cases preferred that the porous support member is movable between a delivery station where the means for delivering molten glass are situated, and a transfer station provided with means for removing the glass from the porous support member and for transferring it to the moulding device. In such cases, means may be provided for controlling the temperature of the environment of the porous support member in the form of a tunnel-shaped enclosure surrounding the path of the porous support member between the delivery station and the transfer station, and means for controlling the temperature in the enclosure. Preferably a plurality of the porous support members are mounted on a rotary table or turret and means are provided for imparting a rotary indexing movement to the table or turret to move the support members in turn from the delivery station to the transfer station.

The transfer of the gob of glass to the mould can be simply done by tilting the receptacle when it reaches the transfer station so as to eject the gob and deliver it to the mould. However this is only feasible where the shape of the gob acquired during the conditioning process is such that it does not matter which way it enters the mould. In some cases it is desirable to use a vacuum take-out means, i.e. means for removing and transferring the gob which are arranged to grip the gob by suction when the receptacle reaches the transfer station, and lift the gob out of the receptacle and deliver it to the mould in a predetermined position.

Preferably the walls of the or each support member are enclosed on the outside by a plenum chamber for the gas, which is connected with a gas supply.

In some cases, the moulding device may comprise means for pressing the glass into contact with the porous support member, which member thus constitutes a mould member, and in such cases the apparatus preferably comprises a plurality of open-topped support members with porous side and bottom walls of concave shape, and means for indexing the support members between stations provided respectively with the glass delivery means, the pressing means, and means for emptying the pressed glass from the support members. The use of the same porous support member for conditioning the glass for moulding and for the final press-moulding results in a saving of process time, while the advantage of a high quality finish is in most cases retained.

With this apparatus, the mould may be charged with the molten glass in the form of a viscous gob which is severed from a mass of glass issuing from an outlet by normally open cut-off means. We prefer, however, when making pressings with the equivalent of a fire-polished finish, to feed the glass as a stream to the mould, the glass being at a temperature at which its viscosity is less than 1000 poises and preferably of the order of 500 poises. The glass issues as a stream from an outlet immediately above the mould and is controlled by normally closed cut-off means.

This embodiment of the invention is particularly applicable for press-moulding articles of thick plano-convex form, such as aspheric lens blanks. The only finishing operations likely to be required for an aspheric lens blank produced in this manner are grinding and polishing of the plane surface. The time from charging the mould to completion of the pressing of the blank can be as little as 30 seconds, and even when allowing for the time required for grinding and polishing the plane surface, if this is needed, the total time for production of an aspheric lens is very much less than that required by the known re-pressing process mentioned above. The pressing tool can be shaped and polished to produce the plane surface of the blank, being modified from a true plane form to compensate for any thermal sag which may occur in the plane surface of the blank on cooling, and in this case further finishing may not be required.

The feeding of the gas under pressure may be discontinued before the glass is pressed, or it may be continued during pressing, because the gas cushion pressure is not sufficient to overcome the moulding pressure applied to the glass. The gas may be fed to the mould at ambient temperature and at a pressure of the order of 5 pounds per square inch above atmospheric. The gas may be nitrogen or another gas which is inert towards the glass and the mould material under the conditions of pressing. Air may be used in some circumstances.

The mould may be formed from sintered stainless steel. Sintered nickel or sintered Monel metal may also be used. The internal mould surface may be finished by mechanical polishing, followed by electrolytic etching to open pores sealed by the mechanical polishing, followed by hand polishing. Alternative materials for the mould are porous graphite or a porous refractory, e.g. ceramic material.

The invention also comprehends glass articles produced by any of the methods described above.

BRIEF DESCRIPTION OF THE DRAWINGS

In the drawings:

FIG. 2 is a sectional view on the line II—II of FIG. 1, but to a larger scale, showing a receptacle in the delivery station.

DETAILED DESCRIPTION OF THE INVENTION

Figures 1, 3:
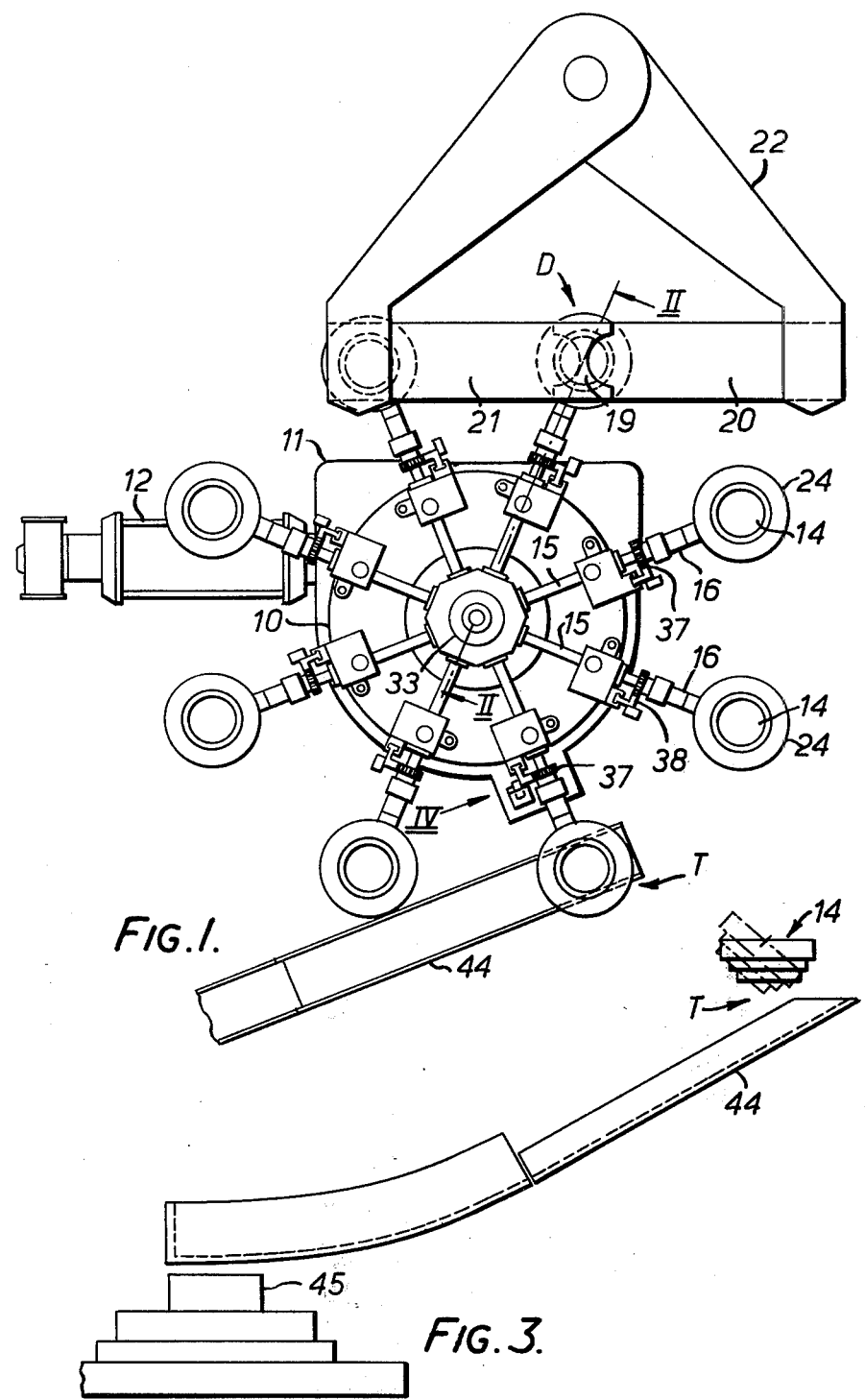
FIG. 1 is a plan view of an apparatus for delivering gobs of glass to a mould, in accordance with a first embodiment of the invention.
FIG. 3 is a detail view of a chute for delivering a gob from the transfer station to a mould.
Figure 4:
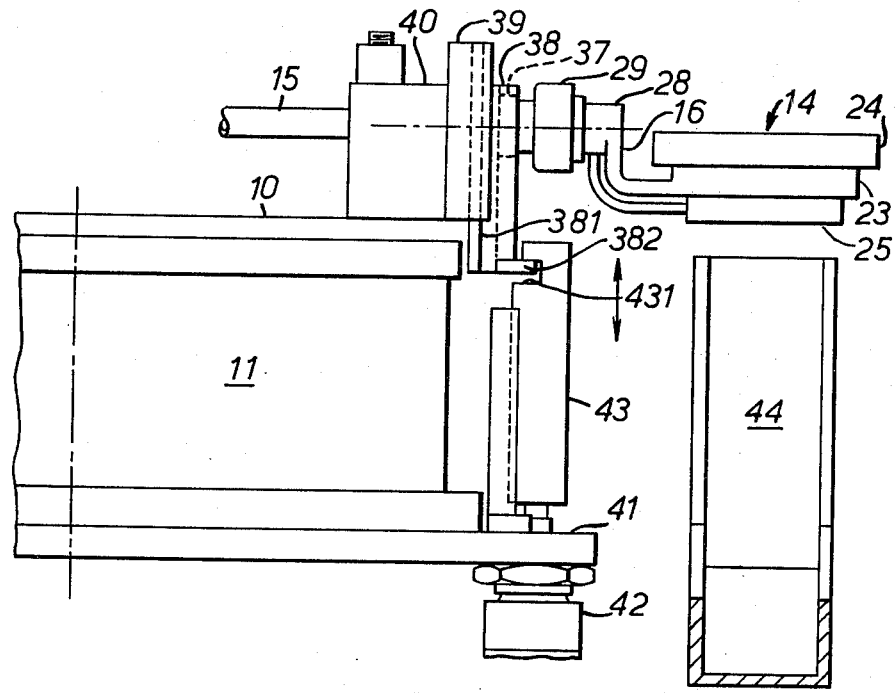
FIG. 4 is a detail view, to the same scale as FIG. 2, of the transfer station, showing the mechanism for transferring a gob from a receptacle to the chute, seen on arrow IV of FIG. 1.
Figure 5:
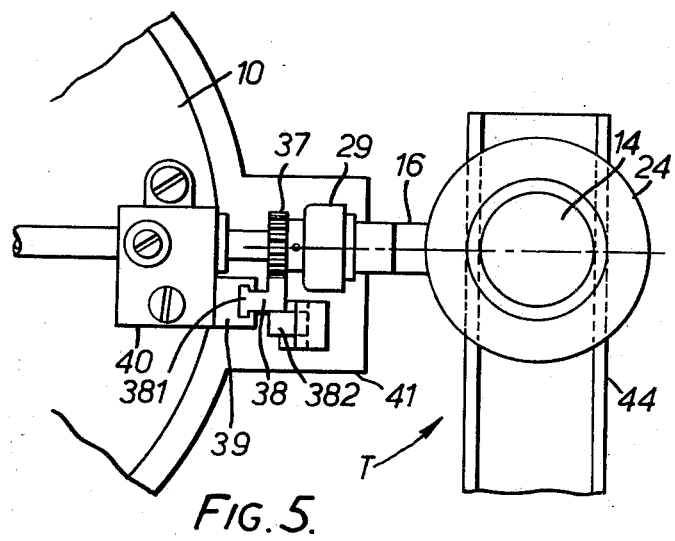
FIG. 5 is a plan view of the same mechanism.

In the apparatus illustrated in FIGS. 1 to 5, a rotary turret 10 is mounted on a stationary pedestal 11 and a hydraulic or pneumatic ram 12 (FIG. 1) is arranged to impart a rotary indexing movement to the turret 10. Eight porous support members or receptacles 14 are mounted on the turret 10, each receptacle 14 being carried on the free end of a horizontal, radially extending arm 15 through a bracket 16, so that the receptacles are indexed around a circular path which includes a delivery station D (FIGS. 1 and 2) at which molten glass can be delivered from a feed tube 17 (FIG. 2) into the receptacle 14, and a transfer station T shown in detail in FIGS. 4 and 5.

At the delivery station D, immediately below the orifice 18 of the feed tube 17, a gate 19 is formed by two plate-like members 20, 21 each of which has a semi-circular cut-out in its ends, so that when they are drawn apart by a shears-like mechanism 22, a circular aperture is formed between them for delivery of the molten glass. This arrangement is similar to one which has been used with more viscous glasses as a shears to cut off a gob, but with the more fluid glasses for which the present apparatus is intended, it is necessary to keep the members 20, 21 normally in the closed position so that the arrangement acts as a gate.

Each receptacle 14 is porous and may be formed from a cohered but relatively finely powdered, highly refractory material, such as sintered, powdered stainless steel, graphite or sintered silicon carbide or other material which will permit gaseous flow through minute tortuous channels, but will still afford substantial resistance to flow so that under low gas pressure from the outside (e.g. of the order of 1 to 30 pounds per square inch) a surface film of the order of 0.5 mm. thick will be formed on the inside.

The receptacle 14 is secured in a ring-shaped part 23 of the bracket 16 by means of a screw-threaded ring 24. A metal dish 25 is secured to the underside of the ring-shaped part 23 to form a closed plenum chamber 26 on the outside of the receptacle 14. An external pipe 27 connects the plenum chamber 26 to the interior of a hollow shank portion 28 of the bracket 16, which is keyed to the end of the arm 15 and attached thereto by a gland nut 29 incorporating an annular gas seal 30. The arm 15 also is hollow, having an axial bore 31 which is connected through a central chamber 32 in the turret 10 and a rotary joint 33 of known type to a stationary inlet 34 for a supply of nitrogen or other gas.

Each arm 15, with the bracket 16 keyed to it, is rotatable about its own axis for tilting the receptacle 14 in the sense illustrated by the arrow in FIG. 3, the arm being supported in bearings 35, 36 mounted on the turret 10. For effecting the tilting movement, each arm 15 carries a pinion 37 which is rigid with the arm, being shown for example as integral with the gland nut 29 and pinned to the arm 15. Each pinion 37 meshes with a corresponding vertical rack 38 (not shown in FIG. 2) having a lateral T-section extension 381 (FIGS. 4 and 5) sliding in a corresponding T-section slot in a guide 39 mounted on a housing 40 of the bearing 36 on the turret 10.

At the transfer station T, the stationary pedestal 11 has an extension 41 carrying a vertical hydraulic or pneumatic ram 42 (FIG. 4) whose piston carries an actuating member 43 having a horizontal slot 431 at its upper end, arranged to engage a horizontal lug 382 on the lower end of each rack 38, for the purpose of enabling the ram 42 to move the rack 38 up and down, to tilt the receptacle and to restore it to the horizontal position.

As best seen in FIG. 3, an inclined chute 44 has its upper end disposed beneath the receptacle 14 at the transfer station T. The lower end of the chute 44 lies above a mould indicated generally at 45 in FIG. 3.

In operation, the turret 10 is given an indexing movement by the ram 12, and a gas which is inert to the material of the apparatus and to the glass is supplied to the inlet 34 and thence to the plenum chamber 26 on the outside of each receptacle 14. At the delivery station D, the members 20, 21 of the gate 19 are drawn apart for a predetermined time to allow the glass to flow into the receptacle 14 below. The temperature and viscosity of the glass being controlled, the rate of flow is known and the time of opening can thus be adjusted to deliver the desired quantity of glass.

The gas may be nitrogen or preferably a mixture of nitrogen with about 5% hydrogen and is delivered at a pressure of the order of 1 to 30 pounds per square inch. The gas then flows through the porous receptacle 14 and provides the requisite cushioning film without actually inducing perceptible gas streams or blast to blow from the porous surface so as to push the glass actively away from the surface. The cushioning film prevents contact between the glass and the porous surface of the receptacle 14, thus allowing the glass to be conditioned to a suitable state for moulding with a substantial reduction in the formation of chill marks, and other imperfections of the kind which the final moulding process cannot wholly remove. The gas cushion can also be used to control the rate of flow of heat from the glass. If necessary the gas can be heated so as to reduce the rate of heat transfer from the glass and thereby to reduce the temperature gradient in the glass.

At the same time as being conditioned for moulding, the gob of glass in the receptacle 14 is being preformed to roughly the correct shape for moulding, and is being carried around to the transfer station T by the indexing movement of the turret 10. When the receptacle 14 reaches the transfer station T, the lug 382 on the rack 38 engages in the slot 431 in the actuating member 43 and the ram 42 is actuated to shift the rack 38 up and down. Due to the movement, the pinion 37 meshing with the rack 38, this movement causes the arm 15 to rotate about its axis to tilt the receptacle 14 as shown in FIG. 3 to eject the gob of glass on to the chute 44 and to return the dish 14 to the horizontal position. The conditioned and preformed gob slides down the chute 44 to the mould 45 where it is moulded to its final desired form in conventional manner.

The receptacle 14 continues to move around its closed circular path, being cooled by the flow of gas, until it reaches the delivery station D again and receives a further gob of glass.

Glass being fed for gob forming in conventional moulding practice is usually at a viscosity of about 5000 poises, but in our process as described above we find we can feed glass to the receptacle 14 at viscosities down to as low as of the order of 50 poises.

Figure 6:
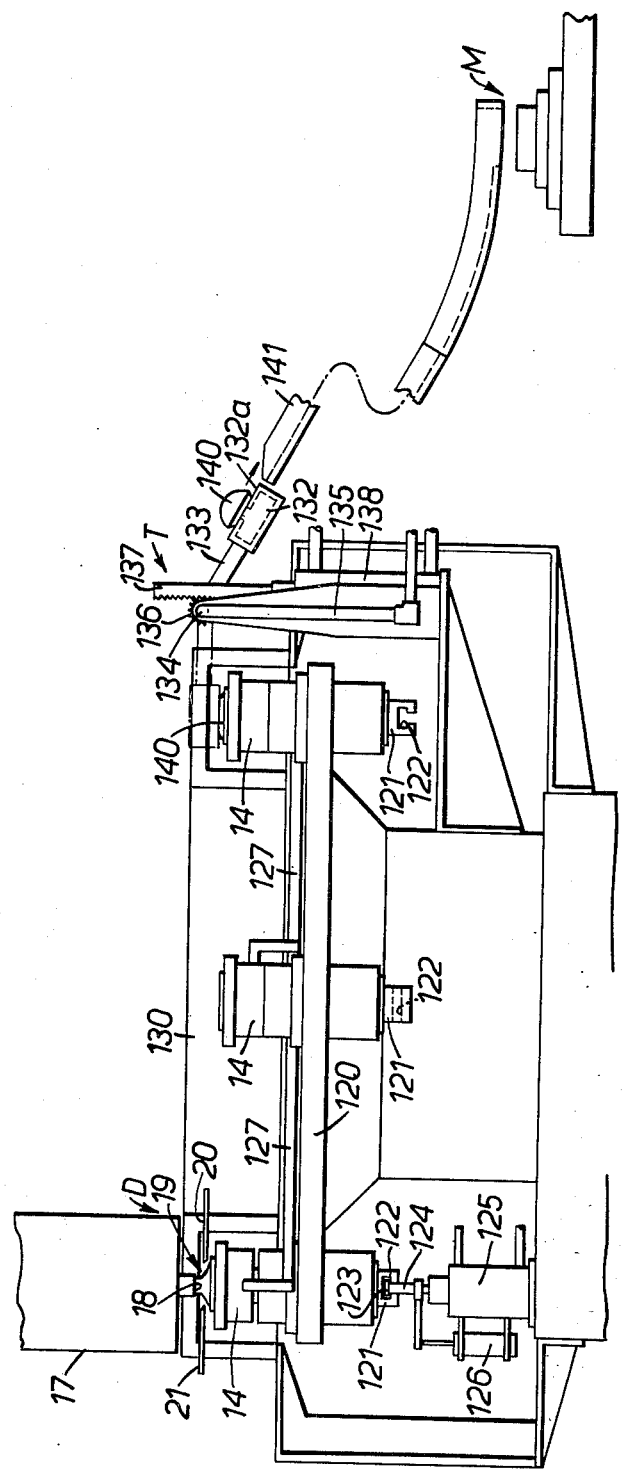
FIG. 6 is a diagrammatic elevation of an alternative form of apparatus, similar to that illustrated in FIGS. 1 to 5 but having a suction-operated gripping means for removing the glass from the porous receptacles, and means for controlling the temperature of the environment of the receptacles.
Figure 7:
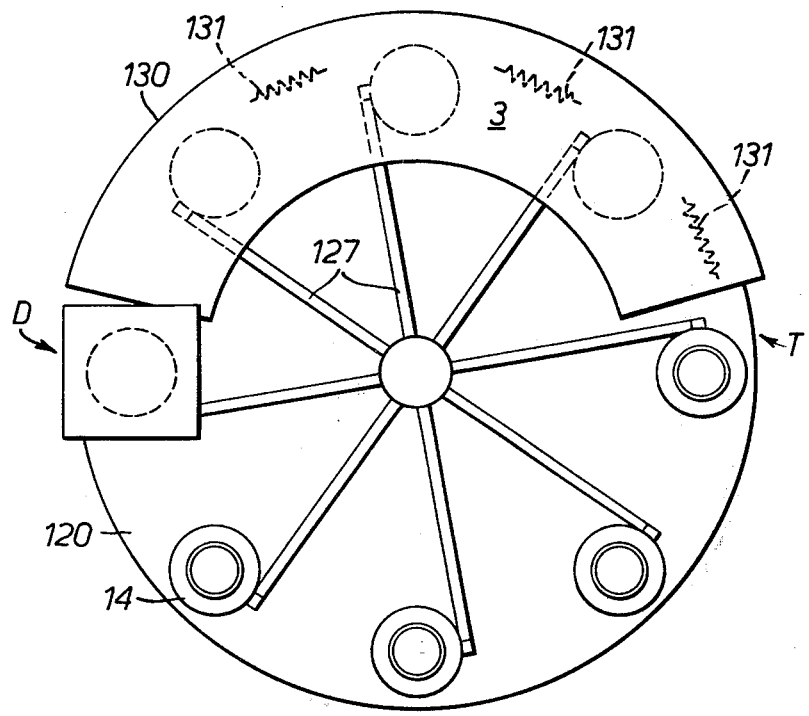
FIG. 7 is a diagrammatic plan view of the apparatus of FIG. 6.

A modified form of the above-described apparatus is diagrammatically illustrated in FIGS. 6 and 7. In this form of apparatus, the porous support members or receptacles 14 are mounted on a rotary table 120 which takes the place of the turret 10 of FIGS. 1 to 5. Only three receptacles 14 are shown in FIG. 6 for clarity. At the delivery station D, the means for delivering glass to the receptacles 14 is similar to that described with reference to FIGS. 1 and 2, incorporating a gate 19 formed by plate-like members 20, 21 below the orifice 18 of the feed tube 17. Details of the delivery station D and the transfer station T have been omitted from FIG. 7 for clarity.

The receptacles 14 are of similar construction to those shown in FIGS. 1 and 2, but they are mounted on the table 120 so as to be capable of being raised through a short distance, as shown at the left-hand side of FIG. 6. For this purpose, each receptacle 14 is secured to the top of a vertically slidable member 121 which has a dove-tail slot 122 in its lower end, disposed so as to engage a complementary formation 123 on the head of a ram 124 operated by a compressed air cylinder 125. Movement of the ram 124 is damped by a pneumatic damper 126. Gas is supplied to the receptacles 14 through flexible pipes 127.

With this construction, as each receptacle 14 reaches the delivery station, it is moved up by the ram 124 to a position immediately below the gate 19, so that when the gate is opened, the glass has initially as short a path as possible to the base of the receptacle. Then as the receptacle 14 is filled it is moved slowly down by the ram 124 to its normal level at which the glass flow is cut off by the members 20, 21 and the receptacle is indexed to the next station. We find that, with certain glass viscosities, this procedure substantially reduces the occurrence of a defect known as "vein" which is due to the glass folding over on itself.

It was mentioned above that the gas can be heated to reduce the temperature gradient in the glass as it is being conditioned in the receptacle 14. The apparatus illustrated in FIGS. 6 and 7 incorporates an alternative means for reducing the temperature gradient, in the form of a tunnel-shaped enclosure or muffle 130 which surrounds the path of the receptacles 14 between the delivery station D and the transfer station T and which is provided with internal heating means, e.g. electric heating elements 131. By means of the muffle 130, the temperature of the environment of the receptacles 14 can be controlled during their passage from the delivery station D to the transfer station T, so as to control the rate of loss of heat from the glass and hence the temperature gradient therein. It has been found that the increased temperature of the environment of the receptacles thus produced enables one to feed the glass to the receptacles at a lower viscosity, i.e. the receptacles can accept a hotter glass while retaining the same profile accuracy in the moulded article. The gas pressure must be adjusted to suit the hotter working conditions and can be as high as 30 pounds per square inch with a hot receptacle. The gas pressure used will also of course depend on the thickness of the receptacle wall, being chosen to sustain the required gas flow rate.

In place of the means described with reference to FIGS. 1 to 5 for tilting the receptacle 14 to eject the gob, it is in many cases preferred to use a vacuum take-out means. This may comprise a graphite block mounted to close off one side of a vacuum chamber and having several narrow vertical bores through it. An arrangement of this kind is shown at the right-hand side of FIG. 6. The vacuum take-out means comprises a circular casing 132 enclosing the vacuum chamber, one side 132a of which is formed by the apertured graphite block. The casing 132 is mounted at the free end of a tubular arm 133 mounted to swing about the horizontal axis of a rotary joint 134. The interior of the casing 132 communicates through the arm 133 and the rotary joint 134 with a vacuum supply pipe 135, in all positions of the arm 133 except that shown in full lines in FIG. 6, in which the vacuum supply is cut off for the purpose described below. The exterior of the rotary joint 134 is provided with gear teeth 136 meshing with the teeth of a rack 137 which is movable vertically by means of a compressed air cylinder 138.

In operation, as a receptacle 14 arrives at the transfer station T with a conditioned gob of glass, the air cylinder 138 is actuated to raise the rack 137 and thereby swing the arm 133 with the casing 132 over the top of the receptacle. Suction applied through the side 132a of the casing 132 grips the gob 140. The air cylinder 138 then retracts the rack 137, swinging the arm 133 and casing 132 over into the inverted position shown in full lines in FIG. 6, in which the vacuum supply is cut off and the gob 140 is consequently released, so that it slides off on to an inclined chute 141 which transfers it to a moulding station M. The gob 140 is by this time shaped to roughly the correct form and conditioned for moulding so that it can be moulded at M to finished form without damage to its surfaces.

Figure 8:
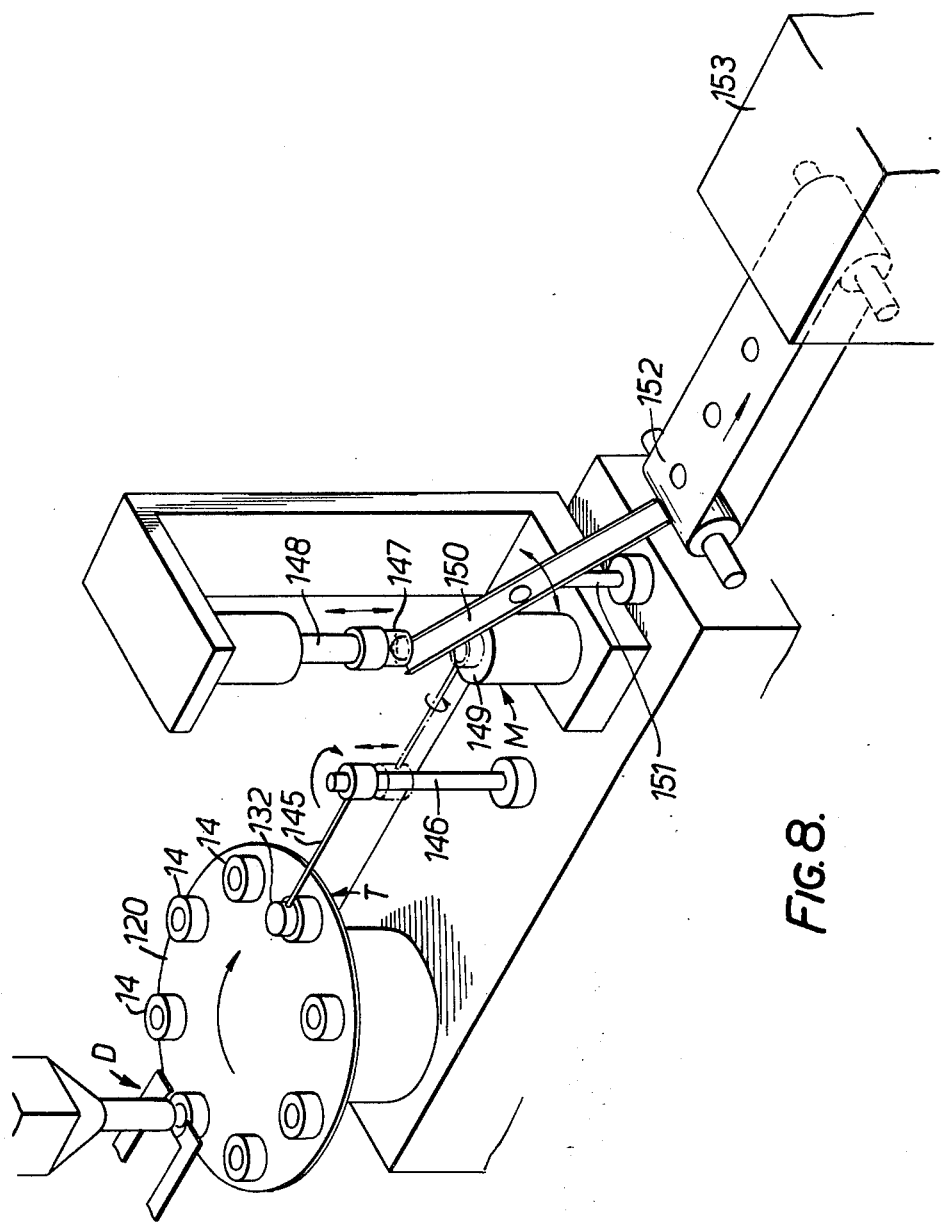
FIG. 8 is a diagrammatic perspective view of another alternative form of apparatus, similar to that of FIGS. 6 and 7 but having different means for removing and transferring the glass.

A modification of the apparatus of FIGS. 6 and 7 is illustrated diagrammatically in FIG. 8. The delivery station D and the rotary table 120 with the receptacles 14 are all similar to those of FIGS. 6 and 7, but the means for removing and transferring the gobs of glass are different. In this example, the vacuum take-out means comprises a circular vacuum casing 132 as before, but it is mounted at the free end of a substantially horizontal arm 145 which is rotatable about its own axis and is itself carried by a vertical column 146 which can be raised and lowered as well as rotated about its own vertical axis.

In operation, the removal and transfer means constituted by the casing 132, arm 145 and column 146 operate as follows. The casing 132 is swung horizontally over the receptacle 14 and lowered to grip the gob 140 by suction. The assembly is then raised to lift the gob 140 out of the receptacle and swung through 180° about the vertical axis of the column 146 while the arm 145 is rotated about its own axis to invert the casing 132 and gob 140. Finally the assembly is lowered to position the gob for final moulding at the moulding station M.

At the moulding station M, a mould 147 is mounted for vertical movement on a ram 148, over an anvil 149. A laterally swingable inclined chute 150 is mounted on a vertical column 151. As the arm 145 lowers the casing 132 on to the anvil 149, the mould 147 is lowered to press the gob 140 into the finished form, e.g. of an aspheric lens. The mould 147 is then raised, lifting the finished article with it, and at its uppermost position the article is ejected by known means. While the mould 147 is being moved up and down, the chute 150 is swung out of the way, but as the mould reaches its uppermost position the chute 150 is swung into its operative position as shown, in which it leads to a belt conveyor 152 delivering to an annealing lehr 153.

The time that the glass is held in the receptacle 14 may be easily varied in any of the apparatuses described above by suitable positioning of the transfer station T at which the conditioned and pre-formed gob is transferred to the final moulding step. This time will vary with glass composition and the quantity of glass needed in the gob to give a final product of a desired size, and the heat transfer conditions within the receptacle 14. We have found that with an alumino-phosphate glass which is difficult to mould by the normal gob forming and moulding techniques, due to its low liquidus viscosity, 25 gm of glass held in the receptacle 14 with nitrogen being supplied at 20°C, at a pressure of 5 lbs. per sq. inch, the minimum time that the gob must be held is 2¼ seconds and under the conditions in this example the gob is then suitable for moulding.

The temperature of the glass in the receptacle can be easily determined using a pyrometer so that the pre-form or gob is held for the minimum time to ensure that it is in a condition for moulding. This temperature will of course be dictated by the composition of the glass, and its viscosity/time/temperature curve. However the pyrometer is only used to get the equipment set up. Once satisfactory parameters of operation have been determined, the glass temperature does not need to be continuously monitored.

In some cases, it may be preferred that after the gob has been conditioned and pre-formed in the receptacle 14 it may be allowed to solidify before ejection, instead of being transferred directly to the final moulding process, and be used in that shape for subsequent moulding to a final form in a so-called re-pressing process. This would reduce the cutting cost as compared with current re-pressing processes, in that at present, a given quantity of glass must be cut from a block for re-pressing, and in addition losses occur due to inaccuracy in cutting.

Figure 9:
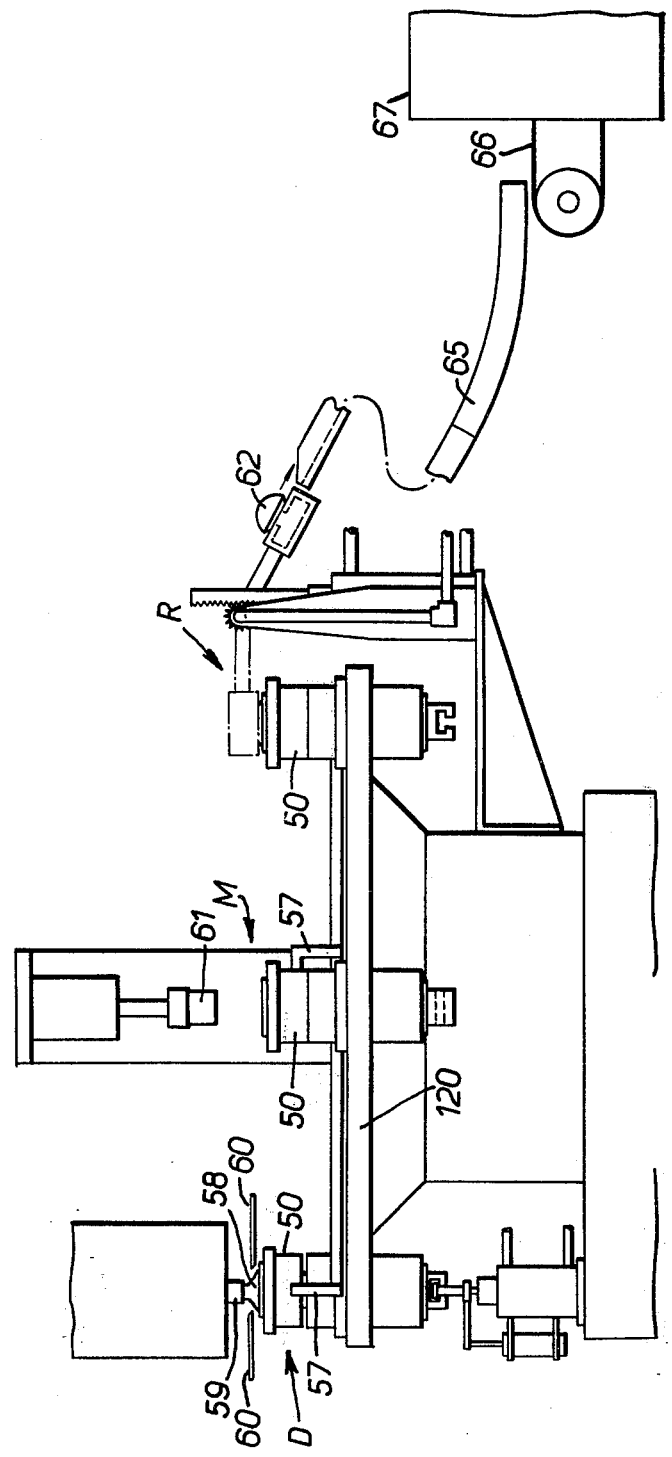
FIG. 9 is a diagrammatic elevation of a further alternative form of apparatus, for moulding aspheric lens blanks, using the porous support members as moulds.

Turning now to the embodiments illustrated in FIGS. 9 to 17, in which the receptacle in which the glass is conditioned also serves as a mould for the article (an aspheric lens blank), FIG. 9 illustrates how the delivery station D, the moulding station M and a removal station R, where the moulded articles are removed from the porous support members 50, can all be arranged around the rotary table 120. The delivery station D may be as illustrated in FIG. 6 and the removal station R may be similar to the transfer station T of FIG. 6, while the moulding station M may be similar to that shown in FIG. 8. From the removal station R, the moulded lens blanks 62 may be delivered via a chute 65 and conveyor 66 to an annealing lehr 67.

One of the porous support members 50, serving as both a receptacle and a mould, is shown in FIGS. 10 to 15 in diagrammatic section. It has a cylindrical open-topped casing 51 receiving a porous insert 52 whose concave upper surface 54 forms the bottom and side walls of the mould. The insert 52 is retained in the casing 51 by a ring 55 screw-threaded on the casing 51. A plenum chamber 56 is formed between the casing 51 and the insert 52 and is supplied with gas, e.g. nitrogen at ambient temperature and a pressure of the order of 5 p.s.i. above atmospheric, through a pipe 57. The gas is thus fed through the porous walls of the mould from outside so as to support the glass in the mould out of contact with the walls on a cushion of gas. The gas pressure is chosen to give a gas cushion of the minimum thickness required to support the glass, e.g. of the order of 0.5 mm.

Figure 10:
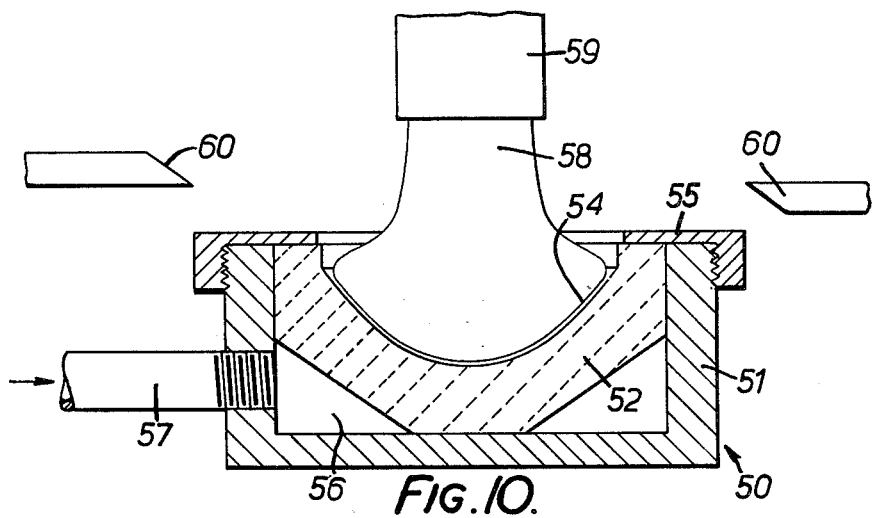
FIGS. 10 to 15 are diagrammatic sectional elevations which illustrate successive stages in the moulding of an aspheric lens blank, on the apparatus of FIG. 9.

As shown in FIG. 10, at the delivery station D, glass which is fluid at the charging temperature is delivered in a stream 58 from a delivery tube 59 immediately above the mould 50, the delivery being controlled by a normally-closed shears mechanism diagrammatically indicated at 60.

Figure 11:
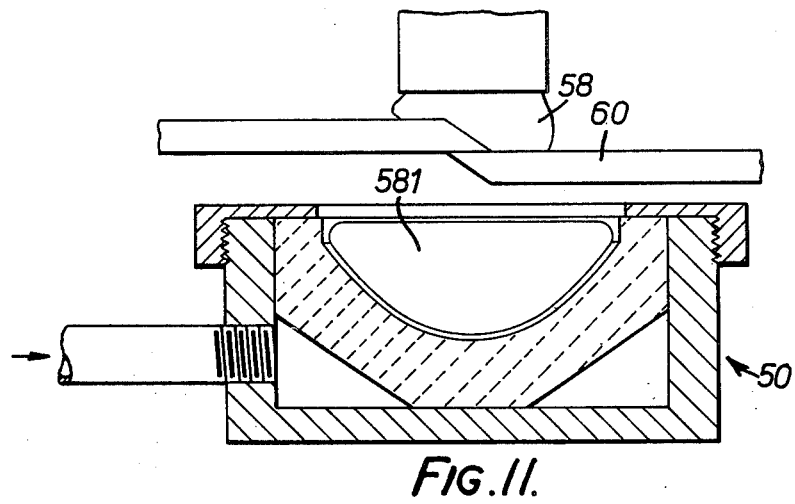

FIG. 11 shows the shears 60 in the closed position to cut off the stream 58 and the glass 581 in the mould assuming a shape approximating to that of the mould under the forces of surface tension, gravity and gas cushion pressure.

The mould 50 is in practice one of the plurality of similar moulds mounted on the moulding table 120 (FIG. 9) which can be indexed to move the moulds successively to the delivery station D, the moulding station M and the mould emptying or removal station R.

Figure 12:
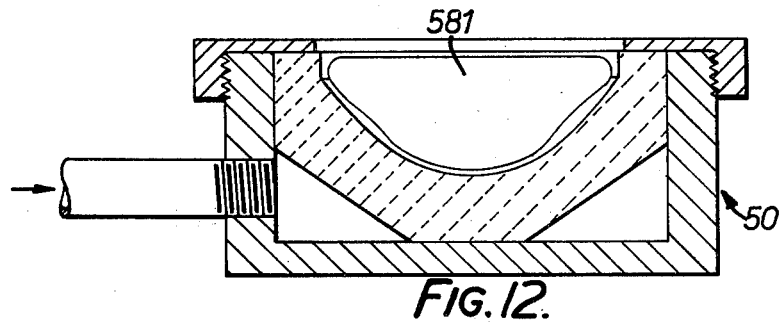

In FIG. 12, the form assumed by the glass is illustrated at the stage at which the mould 50 is being indexed from the delivery station D to the moulding station M. During this stage, the glass is being cooled to a temperature at which it can be press-moulded without any substantial surface damage. It has assumed the approximate shape of the mould, except that surface tension has rounded its upper edges and the gas cushion pressure has slightly indented its convex aspheric surface.

Figure 13:
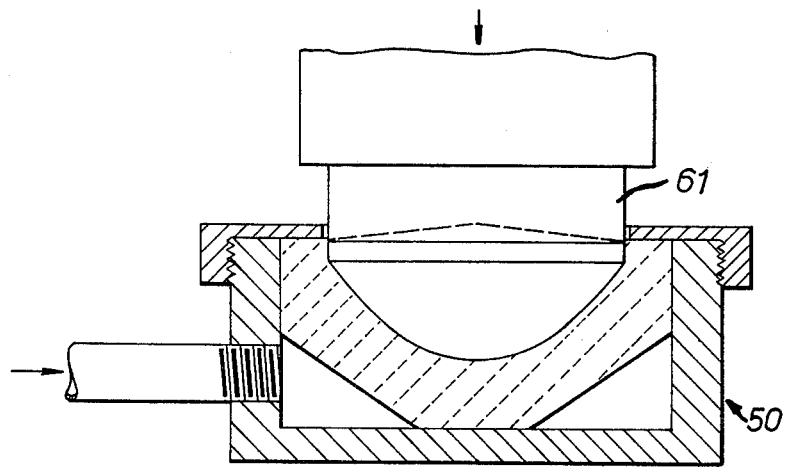

FIG. 13 illustrates the moulding operation, in which a pressing tool or plunger 61 is lowered vertically into the open top of the mould to press the glass to the desired shape by contact with the mould walls. Where the surface area of the gob of glass is greater than that of the finished lens, problems can arise through the formation of wrinkles in the surface. To avoid this, it has been found advisable, in the example illustrated, to modify the surface of the plunger 61 by giving it a slightly conical form, as shown. The conical surface thus produced on the lens tends to flatten during final cooling, due to internal shrinkage of the glass, and it can readily be ground to the desired plane form as described below.

Figure 14:
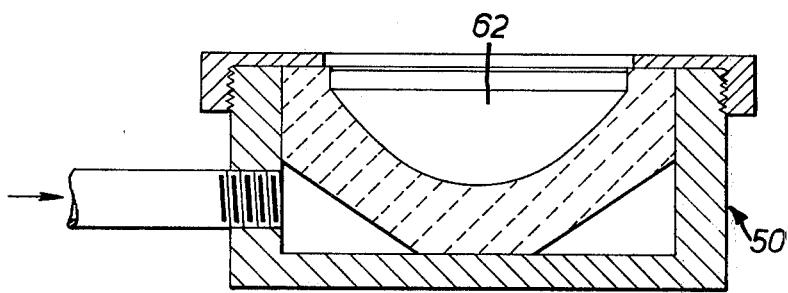

In FIG. 14, the pressing tool 61 has been withdrawn and the mould further indexed towards the mould emptying station R, while the glass "sets up" ready for removal of the aspheric lens blank 62 from the mould.

Figure 15:
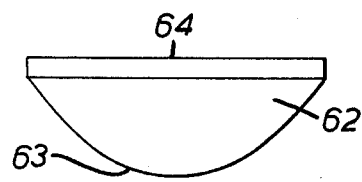

FIG. 15 illustrates the aspheric lens blank 62 after removal from the mould 50. The convex surface 63 substantially retains the fire finish from the mould charging position, due to the support of the gas cushion, and it is only necessary to grind and polish the plane or slightly conical surface 64.

The mould 50 has thus served two purposes; it supports the glass on the gas cushion while the glass acquires the approximate shape of the mould and it acts as a normal mould in imparting the final shape during the moulding or pressing operation.

As mentioned above, the mould insert 52 may be formed from a sintered stainless steel, nickel, Monel metal, porous graphite or a porous refractory material such as a ceramic. The surface should be smooth, the degree of smoothness depending on the final surface finish required and the temperature at which pressing takes place. This temperature must be chosen so that it is not so high that the glass sticks to the mould, or so low that the final blank has the defect known as checks, i.e. small cracks in the surface. The material used for the mould should be a good conductor, but care is needed to avoid choosing a material which will conduct heat away so rapidly as to cause checks. We have found in general that sintered stainless steels are satisfactory, but care may be needed in selecting the pore size, as with coarse pores heat conduction may not be sufficient. A sintered stainless steel which will pass particles of less than 5 microns in size has been found suitable. A suitable surface finish on a sintered metal mould can be achieved by first mechanically polishing the mould, then electrolytically etching to open the pores sealed by the polishing, followed by hand polishing to achieve the final mould surface. It is also possible to use a polished mould in which only a part, e.g. near the base of the mould, has been electrolytically etched and hand polished to give a limited area through which gas can flow to provide the gas cushion.

Porous graphites having a permeability to nitrogen gas ranging from 0.7 $10^{-3}$ to 5 $10^{-3}$ cm$^2$/sec. cm. of water pressure have also been found useful.

Figure 16:
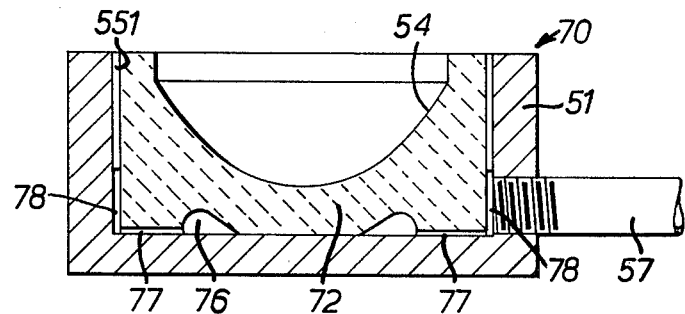
FIG. 16 is a similar view of a modified form of porous mould.

FIG. 16 illustrates a modified form of porous mould 70 for carrying out the method of the invention, having an insert 72 of different shape from the insert 52 of FIGS. 10 to 15, which is retained in the casing 51 by cement as indicated at 551 in place of the screwed ring 55. The plenum chamber is reduced to an annular recess 76 communicating through radial passages 77 and an annular space 78 with the gas inlet pipe 57. With this arrangement, the gas flow into the interior of the mould is mainly concentrated around the lower portion of the mould surface 54.

Figure 17:
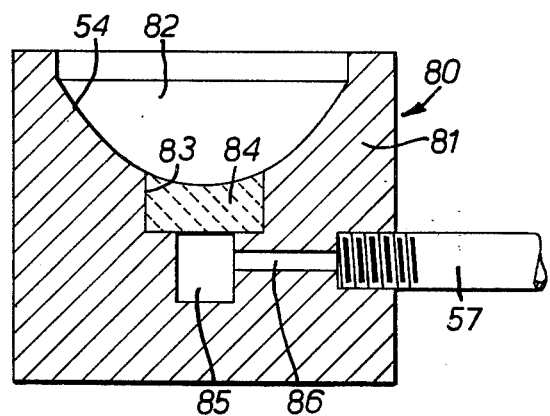
FIG. 17 is a similar view of a partially porous mould.

FIG. 17 illustrates another form of mould, only the lower part of whose surface is porous. The mould 80 comprises a block 81 of solid material, e.g. stainless steel, with the mould cavity 82 formed in its upper part. A cylindrical recess 83 is formed axially in the block 81 to receive a porous insert 84. A further recess 85 below the insert 84 forms the plenum chamber and communicates through a radial passage 86 with the gas inlet pipe 57. The mould surface 54 is thus formed partly by the surface of the solid block 81 and partly by the surface of the porous insert 84.

The method by which the porous mould is charged will depend on the viscosity of the glass at the temperature to which it has been conditioned before transfer to the mould and the viscosity characteristics of the glass. A conventional gob forming technique can be used, but, as indicated above, we prefer to feed the glass at a low viscosity to the mould. Glasses with steep viscosity/temperature curves can also be loaded for pressing by the method of this embodiment of the invention. In this case, the delivery station D will be as shown in FIG. 6, the glass delivery tube 59 being positioned close above the mould 50 to prevent vein formation during delivery i.e. due to the glass folding on itself, and the mould being lowered away from the delivery tube outlet during loading, the glass stream being finally severed by the shears mechanism 60. The temperature of delivery is also chosen to be high enough to minimise shear marks caused when the glass stream is severed.

The hold period when the glass floats freely on the gas cushion is used to allow the gob of glass to become shaped substantially to the shape of the final blank apart from the distortion produced by the gas cushion. This hold period also allows the glass to cool to a state where it can be pressed to the final accurate shape with relatively little damage to the fire-finished surface which has formed on the gas cushion. The final pressing can be carried out with or without the presence of the gas cushion, as the forming pressure is sufficient to overcome the gas cushion pressure.

The total time required from beginning to feed glass to removal of the blank from the mould is of the order of 40 to 60 seconds for a gob weight of 60 gms. The hold time where the gob is held freely on the gas cushion support will of course vary with the quantity of glass involved, the viscosity of the glass, and the viscosity characteristics of that glass. In the case of an ophthalmic crown glass and gob weight of 60 gms, we have found this hold time or conditioning time can vary between 20 and 30 seconds.

Figure 18:
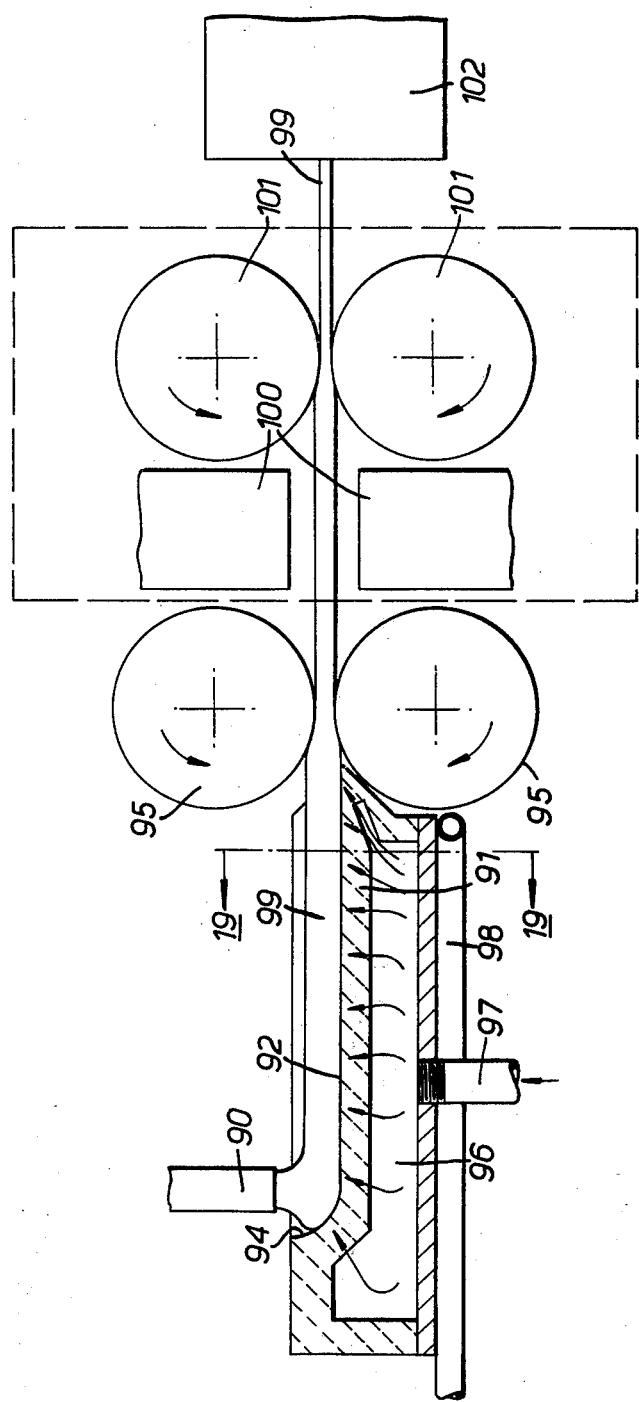
FIG. 18 is a diagrammatic sectional view showing apparatus for the shaping of a glass ribbon in accordance with a further embodiment of the invention.
Figure 19:
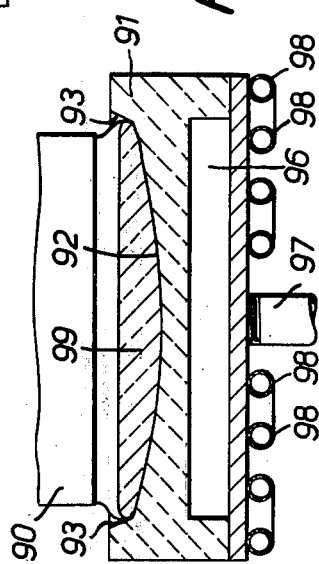
FIG. 19 is a cross-section on line 19—19 of FIG. 18.

In the embodiment of the invention illustrated in FIGS. 18 and 19, the invention is applied to the formation of a glass ribbon having highly polished upper and lower surfaces. The apparatus comprises a delivery spout 90 for molten glass, disposed above one end of a porous, channel-shaped, support member 91. The channel-shaped member 91 has a slightly concave bottom surface 92, shallow side walls 93 (FIG. 15) and an end wall 94 adjacent to the delivery spout 90. At the other end of the member 91 there is no end wall, but a pair of temperature controlled polished rollers 95. The channel-shaped member 91 has on its underside a plenum chamber 96 fed with nitrogen gas by a pipe 97 and it is cooled by water circulated through pipes 98.

In use, molten glass is supplied through the delivery spout 90 on to the porous channel-shaped member 91 while nitrogen under pressure is supplied to the plenum chamber 96, passing through the porous member 91, so that a ribbon 99 of glass is formed on the member 91, supported on a cushion of gas. The ribbon 99 passes along the channel-shaped member 91 while being cooled to a temperature at which it can sustain contact with a solid shaping surface without substantial surface damage. This temperature is reached before the ribbon 99 passes off the member 91 into the nip of the rollers 95, which flatten it and reduce it in thickness without damaging the fire-finish of the upper and lower surfaces.

In some cases, the glass may still be relatively hot in the interior of the ribbon 99 after rolling, even though its surfaces are relatively cool, which could cause unacceptable sagging. In such cases, a pair of heaters 100 is provided to re-heat the surfaces and a further pair of temperature controlled polished rollers 101 for re-rolling the ribbon 99 to remove any such sagging. Finally the ribbon 99 passes into a lehr 102 for annealing.

We claim:
1. A method of shaping glass to a desired form in which delivered molten glass can be brought to a suitable viscosity condition for shaping independently of the viscosity of delivery, the method comprising:
   feeding gas under pressure through minute, tortuous, gas flow channels of a porous wall of a support member, located at least at the base of the support member, from the reverse side of said wall into a support cavity defined by a cavity surface presented by the support member;
   delivering molten glass into the support cavity, while so feeding the gas under a pressure
   sufficient to support the glass, while it is in a viscosity condition wherein it can distort or flow, out of contact with the cavity surface on a cushion of gas, but
   insufficient to induce perceptible gas stream or blast to blow from the cavity surface so as to push the glass actively away from the cavity surface;
   maintaining the glass floating freely in the support cavity on the established gas cushion support of the glass, out of contact with the cavity surface, for a hold time during which
   the glass in the support cavity is allowed to assume, under the forces of surface tension, gravity and gas cushion pressure, a shape approximating to that of the support cavity and having a fire-finished glass surface, and
   the glass is cooled to a viscosity condition such that it can be further shaped by contact with a solid surface without any substantial surface damage to the fire-finished glass surface formed on the gas cushion; and
   shaping the so conditioned glass by a shaping process which involves contact with such a solid surface.

2. A method according to claim 1, wherein the conditioned glass is shaped by a moulding process.

3. A method according to claim 2, wherein a measured quantity of molten glass is delivered into the support cavity.

4. A method according to claim 1, wherein the gas is fed at ambient temperature.

5. A method according to claim 1, wherein the rate of heat transfer from the glass, while supported on the gas cushion, is controlled by controlling the temperature of the gas and/or the flow rate of the gas.

6. A method according claim 1, wherein the rate of heat transfer from the glass, while supported on the gas cushion, is controlled by controlling the temperature of the environment of the support member.

7. A method according to claim 1, wherein the gas is fed to the mould at a pressure of the order of 1 to 30 pounds per square inch above atmospheric.

8. A method according to claim 1, wherein the gas is nitrogen.

9. A method according to claim 1, wherein the gas is a mixture of nitrogen with substantially 5% by volume hydrogen.

10. A method according to claim 2, wherein the conditioned glass is removed from the support cavity to a separate mould in which the moulding process is carried out.

11. A method according to claim 10, wherein a plurality of the support cavities are indexed around a closed path between a delivery station at which the glass is delivered into each support cavity in turn and a transfer station at which the glass is removed from the support cavity for delivery to a moulding station.

12. A method according to claim 11, wherein the glass in each support cavity in turn is gripped by a suction-operated gripping means when the support cavity arrives at the transfer station, and the glass is then lifted out of the support cavity, inverted and delivered to the moulding station.

13. A method according to claim 12, wherein the suction-operated gripping means is swung about a substantially horizontal axis to effect the lifting and inversion of the glass.

14. A method according to claim 13, wherein the inverted glass is released by the gripping means and passes down an inclined chute to the moulding station.

15. A method according to claim 12, wherein the suction-operated gripping means is lifted and then swung about a substantially vertical axis, while being simultaneously inverted by being turned about a horizontal axis, to effect the lifting and inversion of the glass.

16. A method according to claim 15, wherein the mould is lowered on to the inverted gripping means at the moulding station to mould the glass to the desired form.

17. A method according to claim 16 wherein, after moulding, the moulded glass is lifted by the mould and then released on to a laterally swinging chute, down which the moulded glass passes to an annealing lehr.

18. A method according to claim 2, wherein the moulding process is carried out by pressing the glass into contact with the support member, which constitutes a mould member.

19. A method according to claim 18, using an open-topped support member with walls of concave shape, wherein a pressing tool is pressed down on to the glass from above to form the glass to the desired shape.

20. A method according to claim 18, wherein the feeding of the gas under pressure is discontinued before the glass is pressed.

21. A method according to claim 19, wherein the feeding of the gas under pressure is continued while the glass is pressed.

22. A method according to claim 1 wherein the conditioned glass is shaped by a rolling process.

23. A method according to claim 22, wherein the conditioned Glass is fed directly from the support member to at least one pair of internally cooled, polished finishing rollers.

24. A method according to claim 22, of shaping glass to ribbon form, using a channel-shaped support member, wherein the glass, while supported on the gas cushion, is allowed to flow along the channel-shaped support member while assuming a ribbon shape under the forces of surface tension, gravity and gas cushion pressure, and the conditioned glass is then passed between at least one pair of polished rollers to shape it to the desired final ribbon form.

25. Apparatus for shaping glass to a desired form in which delivered molten glass can be brought to a suitable viscosity condition for shaping independently of the viscosity of delivery, the apparatus comprising:
a support member having a porous wall located at least at the base thereof and presenting minute, tortuous, gas flow channels, said support member presenting a cavity surface defining a support cavity;
means for delivering molten glass into said support cavity;
means for feeding gas through said porous wall of said support member, from the reverse side thereof into said support cavity at a pressure
sufficient to support the glass, while it is in a viscosity condition wherein it can distort or flow, out of contact with the cavity surface on a cushion of gas, but
insufficient to induce a perceptible gas stream or blast to blow from the cavity surface so as to push the glass actively away from that cavity surface;
said gas feeding means and said support cavity being cooperable to maintain the glass floating freely in the support cavity on the established gas cushion support of the glass, out of contact with the cavity surface, for a hold time during which
the glass in the support cavity is allowed to assume, under the forces of surface tension, gravity and gas cushion pressure, a shape approximating to that of the support cavity and having a fire-finished glass surface; and
the glass is cooled to a viscosity condition such that it can be further shaped by contact with a solid surface without any substantial surface damage to the fire-finished glass surface formed on the gas cushion; and
means for subsequently shaping the so conditioned glass by a shaping process which involves contact with a solid surface.

26. Apparatus according to claim 25, wherein the means for shaping the glass by a process which involves contact with a solid surface is a moulding device.

27. Apparatus according to claim 26, wherein the means for delivering molten glass is adapted to deliver a measured quantity of the molten glass into the support cavity.

28. Apparatus according to claim 25, wherein means are provided for controlling the temperature of the gas and/or the flow rate of the gas.

29. Apparatus according to claim 25, wherein means are provided for controlling the temperature of the environment of the support member.

30. Apparatus according to claim 26, wherein the support member is movable between a delivery station where the means for delivering molten glass are situated, and a transfer station provided with means for removing the glass from the support cavity and for transferring it to the moulding device.

31. Apparatus according to claim 30, wherein the means for controlling the temperature of the environment of the support member comprise a tunnel-shaped enclosure surrounding the path of the support member between the delivery station and the transfer station, and means for controlling the temperature in the enclosure.

32. Apparatus according to claim 31, wherein the means for controlling the temperature in the enclosure comprise heating means in the enclosure.

33. Apparatus according to claim 30, wherein a plurality of the support cavities are mounted on a rotary table or turret and means are provided for imparting a rotary indexing movement to the table or turret to move the support cavities in turn from the delivery station to the transfer station.

34. An apparatus according to claim 30, wherein the means for removing and transferring the glass include suction-operated gripping means arranged to grip the glass by suction when the support cavity reaches the transfer station and then to lift the glass out of the support cavity and invert it, before it is delivered to the moulding device.

35. Apparatus according to claim 34, wherein the suction operated gripping means is mounted for swinging movement about a substantially horizontal axis so as to effect the lifting and inversion of the glass.

36. Apparatus according to claim 34, wherein an inclined chute is provided to receive the glass from the suction-operated gripping means after inversion of the glass and to transfer the glass to the moulding device.

37. Apparatus according to claim 34, wherein the means for removing and transferring the glass comprise a substantially horizontal arm carrying the suction-operated gripping means at one end, means for lifting the arm to remove the glass from the support member, means for swinging the arm about a substantially vertical axis and means for rotating the arm about its own axis while it is being swung about the substantially vertical axis, so as to invert the gripping means and the glass and to transfer the glass to the moulding device.

38. Apparatus according to claim 37, wherein the mouding device comprises a mould, and means for lowering the mould on to the inverted gripping means, to mould the glass to the desired form, and for subsequently raising the mould therefrom.

39. Apparatus according to claim 38, wherein the means are providing for ejecting the moulded glass article from the mould after the mould has been raised, and a laterally swingable inclined chute is arranged to swing into position below the mould after it has been raised to receive the moulded glass article and to transfer it to an annealing lehr.

40. Apparatus according to claim 38, wherein the moulding device comprises means for pressing the glass into contact with the support member, which member thus constitutes a mould member.

41. Apparatus according to claim 40, comprising a plurality of open-topped support members with porous side and bottom walls of concave shape, and means for indexing the support members between stations provided respectively with the glass delivery means, the pressing means, and means for emptying the pressed glass from the support cavities.

42. Apparatus according to claim 25, wherein the means for shaping the glass by a process which involves contact with a solid surface is a rolling device.

43. Apparatus according to claim 42, wherein the rolling device comprises at least one pair of internally cooled, polished finishing rollers.

44. Apparatus according to claim 42, for shaping glass to ribbon form, wherein the support member is channel-shaped to permit the glass to flow along it while assuming a ribbon shape, and the rolling device comprises at least one pair of polished rollers arranged to receive the glass as it flows from the support member.

45. Apparatus according to claim 25, wherein the support member is formed from sintered stainless steel.

46. Apparatus according to claim 25, wherein the support member is formed from sintered nickel.

47. Apparatus according to claim 25, wherein the support member is formed from sintered Monel metal.

48. Apparatus according to claim 45, wherein the internal surface of the support member has been finished by mechanical polishing, followed by electrolytic etching to open pores sealed by the mechanical polishing, followed by hand polishing.

49. Apparatus according to claim 25, wherein the support member is formed from porous graphite.

50. Apparatus according to claim 25, wherein the support member is formed from a porous ceramic material.

* * * * *